United States Patent [19]

Shafer

[11] Patent Number: 5,139,290
[45] Date of Patent: Aug. 18, 1992

[54] QUICK COUPLING FOR PLASTIC PIPE

[76] Inventor: Terry C. Shafer, 101 Industrial, Perryton, Tex. 79070

[21] Appl. No.: 542,921

[22] Filed: Jun. 25, 1990

[51] Int. Cl.⁵ ............................................. F16L 17/04
[52] U.S. Cl. ................................... 285/112; 285/371; 285/373; 285/423
[58] Field of Search ............... 285/423, 371, 398, 373, 285/419, 112

[56] References Cited

U.S. PATENT DOCUMENTS

| | | | |
|---|---|---|---|
| 3,178,206 | 4/1965 | Martin et al. | 285/423 X |
| 4,039,210 | 8/1977 | Wood et al. | 285/423 X |
| 4,093,280 | 6/1978 | Yoshizawa et al. | 285/423 X |
| 4,252,349 | 2/1981 | Mahoff | 285/423 X |
| 4,519,637 | 5/1985 | Folkers | 285/371 X |
| 4,557,509 | 12/1985 | Giebeler | 285/419 X |
| 4,614,369 | 9/1986 | Overath et al. | 285/371 X |
| 4,629,220 | 12/1986 | Crusco | 285/423 X |
| 4,660,865 | 4/1987 | Workman | 285/423 X |

Primary Examiner—Randolph A. Reese
Assistant Examiner—Heather Chun
Attorney, Agent, or Firm—Robert C. Peterson

[57] ABSTRACT

A quick coupling for plastic pipe in which the ends of each plastic pipe are fitted with a metallic sleeve. The metallic sleeve is contoured with a hollow boss at one end and spaced apart from the boss is a radially extending circular groove. The metallic sleeve may be counterbored. The metallic sleeve may be embedded in the plastic pipe end by various heat forming techniques. Further, the plastic pipe may be internally threaded. Then a hollow plug of the same plastic as the pipe with external threads at one end is contoured to form a collar with the face of the unthreaded end. The collar is recessed to receive the boss. The metallic sleeve is fitted over the threads and seated with the boss in the recess of the collar. The plastic plug is then threadably engaged in the end of the plastic pipe and sealed with an o-ring. Two pipes, each having a metallic sleeve thereon, when aligned are coupled together by a mechanical clamp having keys which fit the circular groove of each pipe. The clamp maintains a pressure seal about the pipe end so coupled.

12 Claims, 3 Drawing Sheets

QUICK COUPLING FOR PLASTIC PIPE

BACKGROUND OF INVENTION

This invention relates to a quick coupling for plastic pipe and more particularly to arrangements accommodating the use of mechanical couplers for plastic pipes.

The coupling and uncoupling of sections of plastic pipe, particularly such as PVC (polyvinylchloride) or ABS (Polyacrylonitrile-Butadiene-Styrene) pipe, in a simple and effective manner as is done with metal pipe is desired. Plastic pipe, however, does not have the strength or rigidity of metal pipe and grooving it weakens it still more. Thus, for full effectiveness, special provisions must be made for joining sections of such pipe to prevent the pipe from separating at the joint.

In the prior art, various methods have been tried to link or couple plastic pipe together or with metal pipe and the methods used were those that related mostly to metal pipe and were frequently unsatisfactory. One such method is discussed in U.S. Pat. No. 3,695,638 issued to James Blakely. In the Blakely patent, which discloses a coupling for plastic pipe which is now marketed under the name Victaulic (a U.S. registered trademark) provided grooves near the end of the plastic pipe similar to that used in metallic pipe. Blakely's coupling utilizes a foot or key that meets the groove wall in a plastic pipe. Blakely discusses the problem in a key and groove coupling where the plastic pipe is in a deflected position and internal pressure increases, in which a shearing of the groove shoulder can occur resulting in the coupling parting. The coupling in Blakely has lateral wings on either side of the key to assist in reducing possible deflection of the plastic pipe.

U.S. Pat. No. 4,310,184 issued to Steve Campbell, discloses a connector sleeve for polyolefin pipe ends which takes advantage of the deformability of the polyolefin pipe. Campbell discloses the use of a metallic sleeve which has interior circumferential ribs which engage in mating relationship, exterior grooves that are formed in the exterior of the pipe ends to be joined. With such pipe ends butted together and the connector sleeve overlaying the joint, a conventional clamp having again interior circumferential ribs or ridges, engages the indentation on the sleeve where the interior circumferential ribs are formed.

In U.S. Pat. No. 2,967,067 issued to Heinrich Singer describes a connecting means for soft tubes and provides a connector fitting which uses tooth shaped protrusions that grip the plastic pipe.

U.S. Pat. No. 4,114,930 issued to Donald Perkins, et al describes a method for coupling plastic pipe in which the ends of the pipe are swedged over a tubular insert having exterior serrations and the tubing becomes permanently held between the insert and the sleeve. Such an arrangement is not feasible for rigid plastic pipe and has additional deficiency of interrupting the flow pattern of fluid through the pipe.

A different approach is used in U.S. Pat. No. 4,039,210 issued to Roy Wood, et al. A circumferential recess is formed on the outside surface of the pipe and this recessed area is further treated to form three circumferential grooves on the outside surface of the pipe. A first metal sleeve is inserted in the recess extending away from the groove furthest removed from the coupling end of the pipe. A split locking ring is inserted in the groove furthest removed from the coupling end of the pipe and a resilient gasket ring is inserted in the middle groove. A second metal sleeve is inserted in the recess abutting the lock ring and encasing the gasket ring in the middle groove. A second metal sleeve is indented so that it fits into the third groove, the groove nearest the coupling end of the pipe, retaining the grooved configuration. A third metal sleeve is slidably positioned encasing the lock ring and overlapping the first and second metal rings and this third metal sleeve is then fixed into position. It can readily be seen that the order in which the elements of the invention are put into position is important. The resilient gasket must be in position before the second metal sleeve is positioned and both the first and second metal sleeves and the lock ring must be positioned before the third metal sleeve can be put into place.

This complex arrangement then utilizes a metal clamp, such as the Victaulic clamp previously discussed to retain the pipes coupled together.

SUMMARY OF INVENTION

In accordance with the invention, a plastic pipe end is fitted with a metallic sleeve which has a hollow boss at one end thereof and spaced back from said hollow boss is a circumferential channel or groove which may be discontinuous. A hollow plug having an internal diameter identical with an internally threaded pipe is externally threaded at one end for threadably engagement with the pipe. The other end of the plug has an outer diameter the same as the pipe. Spaced back from the flat end of the plug, said plug has a reduced diameter portion thereby forming a collar on the plug with an undercut circular recess or groove therein, forming an overhanging circumferential or peripheral ledge. When the plug is threaded into the pipe, an o-ring seals the plug and the pipe joint with the sleeve seated against the end wall of the pipe joint and the hollow boss in the undercut circular recess or groove of the collar. Thereby, the sleeve is firmly affixed about the periphery of the plug intermediate the threads and the collar. When two pipes are each fitted with such plug and placed with the flat ends juxtapositioned, a suitable mechanical clamp having keys which fit into the grooves provided by the metallic sleeves can be utilized to couple the two pipe joints together. The mechanical clamp can be the Victaulic Clamp previously discussed.

It should be understood that the external contour of the plug and the internal contour of the sleeve may be readily conformed to the desired shapes by mechanical machine type operations. The plug may also be formed by injection molding techniques. Further, the plastic pipe may be polyethylene, polypropylene or other material. The metallic sleeve may be carbon steel or stainless steel, as well as other metal.

Moreover, with the boss on the metallic sleeve intergral with the undercut circular recess or groove in the collar region of the plug the pipe end is so formed intergral therewith, the boss on the metallic sleeve provides rigidity to and maintains the shape of the plastic plug or pipe end over a wide range of temperatures in the region of the coupler where it is most needed. This arrangement prevents the plastic underneath the coupler from contracting away from the sealing gasket and allowing leakage with extreme temperature changes.

In another embodiment, instead of the plug, the metal sleeve may be placed about a pipe end using various heat forming techniques in which the plastic is softened and can be mechanically drawn and upset to embed the metallic sleeve in said pipe end with plastic surrounding the boss end of the sleeve such that only the channel or groove in the metallic sleeve on the outer peripheral surface of the sleeve are exposed. When such pipe ends are aligned, a mechanical clamp similar to the Victaulic Clamp previously discussed, may be fitted over the pipe ends with its key in the channel or groove of the metallic sleeve to couple the pipes together.

The principal object of this invention is to provide an improved metallic sleeve adapted to be secured in a pipe end in such a manner as to provide a groove for the key or foot of a mechanical clamp which is not likely to allow uncoupling to occur by deflections which would normally be encountered in plastic pipe which has been coupled without such a metallic sleeve.

An additional object of this invention is to provide an improved metallic sleeve adapted to be secured in a pipe end in such a manner as to provide a groove for the key or foot of a mechanical clamp and having a boss or the like that is integral with the pipe end to provide rigidity to and maintain the shape of the plastic plug or pipe end over extreme temperature variations.

Another object of the invention is to provide a hollow plug of the same plastic material as the pipe joints to be joined which is mechanically adapted to firmly seat a metallic sleeve in its periphery for mechanically clamping two similarly fitted pipe joints together.

Still another object of the invention is to provide a suitable metallic sleeve portion for a pipe joint which provides a groove or channel for seating the keys of a mechanical coupler which is designed to couple plastic pipe together.

Further, it is the object of the invention to provide such a metallic sleeve on a pipe joint for seating of metallic clamps which couple pipe joints together while maintaining the fluid flow pattern in the pipeline relatively uninterrupted.

These and other objects and advantages of the invention will become apparent as further described herein.

DESCRIPTION OF THE PREFERRED EMBODIMENT

Figure 4:
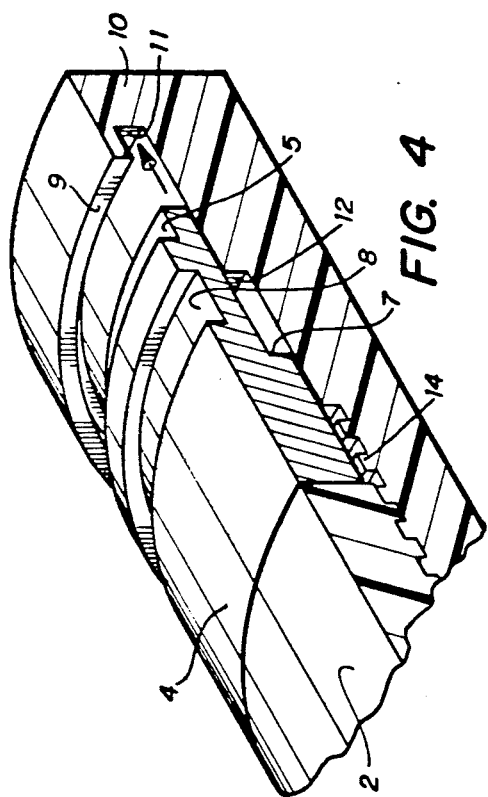
FIG. 4 is a broken away perspective view of the section of the plug and metallic sleeve where the plug is partially threaded into the pipe.
Figure 1:
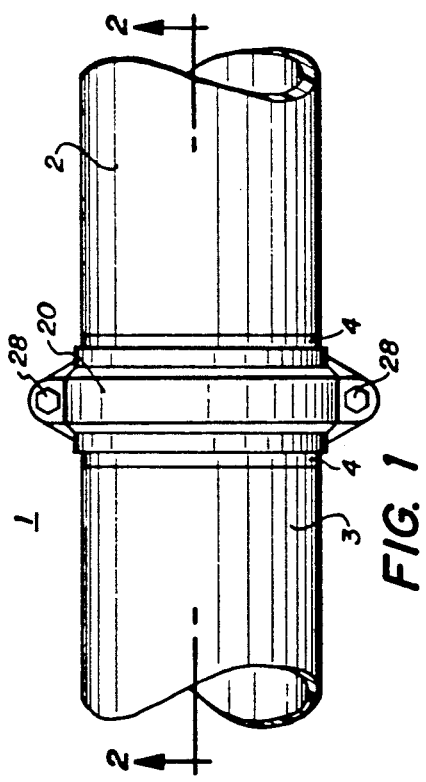
FIG. 1 is a side view of two pipe joint coupled together by a mechanical clamp utilizing the metallic sleeve.
Figure 3:
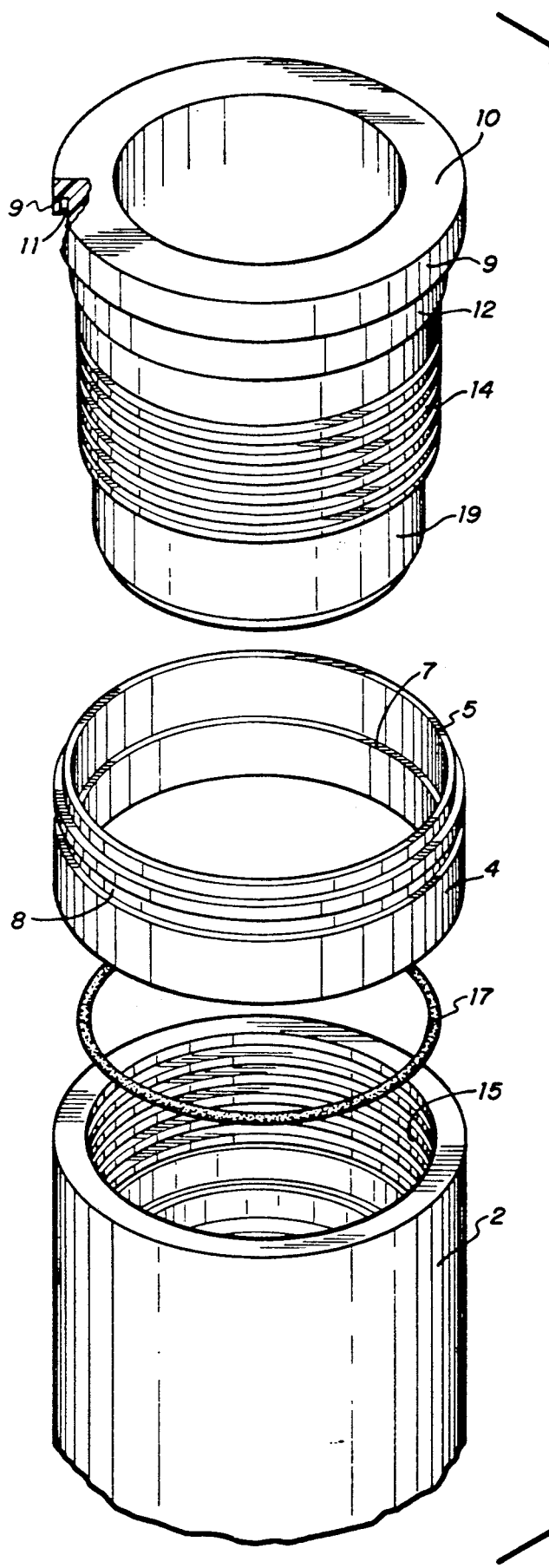
FIG. 3 is an exploded perspective view of the plug, metallic sleeve, o-ring and pipe end.

In FIG. 1, generally indicated is applicant's quick coupler 1 which illustrates two sections of pipe 2 and 3 coupled together by a clamp 20, such as a victaulic clamp, which seats in the grooves or depressions 8 of metallic sleeve 4 of each pipe (not shown in FIG. 1) as best seen in FIGS. 3 and 4.

Figure 2:
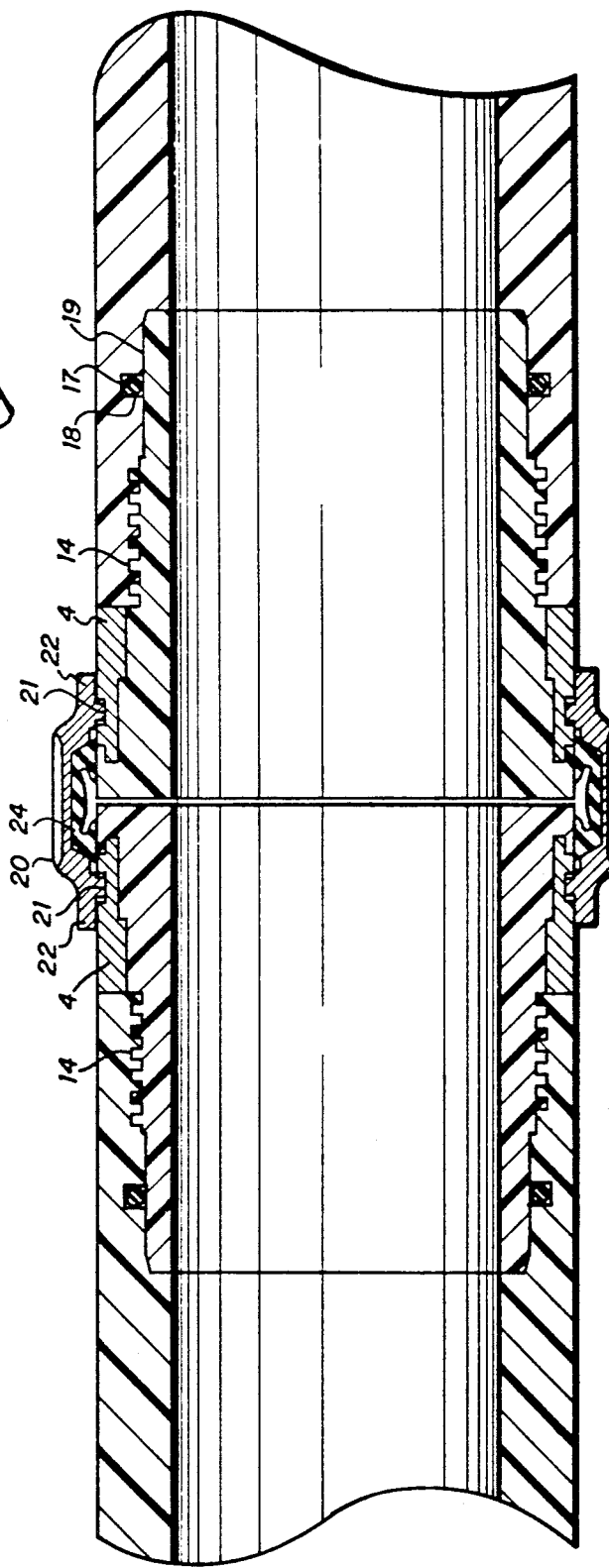
FIG. 2 is a cross-sectional view of two pipe joints taken along section 2—2 of FIG. 1.

Referring now to FIGS. 2, 3 and 4, a plug 10 has threads 14 which provide threadable engagement with similarly threaded pipe sections. Plug 10 has a ledge 9 and a circular undercut recess 11, as well as a ridge 12. The plug 10 is made of the same material that pipe 2 is made from. An o-ring 17 is provided for seating in groove 18 of the pipe 2 for purposes of sealing the plug 10 with the pipe 2 upon treadable engagement. Each pipe would have an o-ring sealing arrangement. The sleeve 4 has a boss 5 at one end and a depression or channel 8 about its periphery. In addition the sleeve 4 may have counterbore 7 extending through the boss 5 and channel 8.

In use, sleeve 4 is fitted over the threads 14 of plug 10 and seated in circular undercut recess 11 with the boss 5 of sleeve 4 under ledge 9. The plug 10 is then threaded in pipe 2 and sealing face 19 seats over o-ring 17 in the groove 18. When fully threaded into a pipe end such as 2, plug 10 seats the sleeve 4 with boss 5 under the ledge 9 in circular undercut recess 11. The counterbore 7 in sleeve 4 seats against ridge 12 of the plug 10 and the other end of sleeve 4 seats against the face of pipe 2.

As previously mentioned, when two such pipe ends 2 and 3, are placed in alignment, they may be coupled by any suitable metallic clamp. In FIGS. 1 and 2, a victaulic clamp previously mentioned, is used. The victaulic clamp 20 includes a key section 21 which seats in depression or channel 8 of each sleeve 4 and wings 22 engage the peripheral surface of sleeve 4. A pressure gasket 24 is held in place by the clamp 20 and when bolts 28 are tightened (as viewed in FIG. 1) the coupling of the pipe sections is complete with a pressure seal.

The use of depression or channel 8 described herein is one of several means to provide a seat for keys or feet of a mechanical clamp. For example the channel 8 could be several depressions or seats spaced about the periphery of the sleeve 4 thereby accommodating a clamp designed with mating keys or feet. The peripheral pattern of such depressions or seats is not confined to any specific surface pattern and are not required to be symmetrical although it may be the desirable pattern.

It will be further understood that the embodiment using the plug 10 and sleeve 4 when employed in the field permit the sleeve of different metal to be readily substituted to provide for differing environmental conditions.

Figure 5:
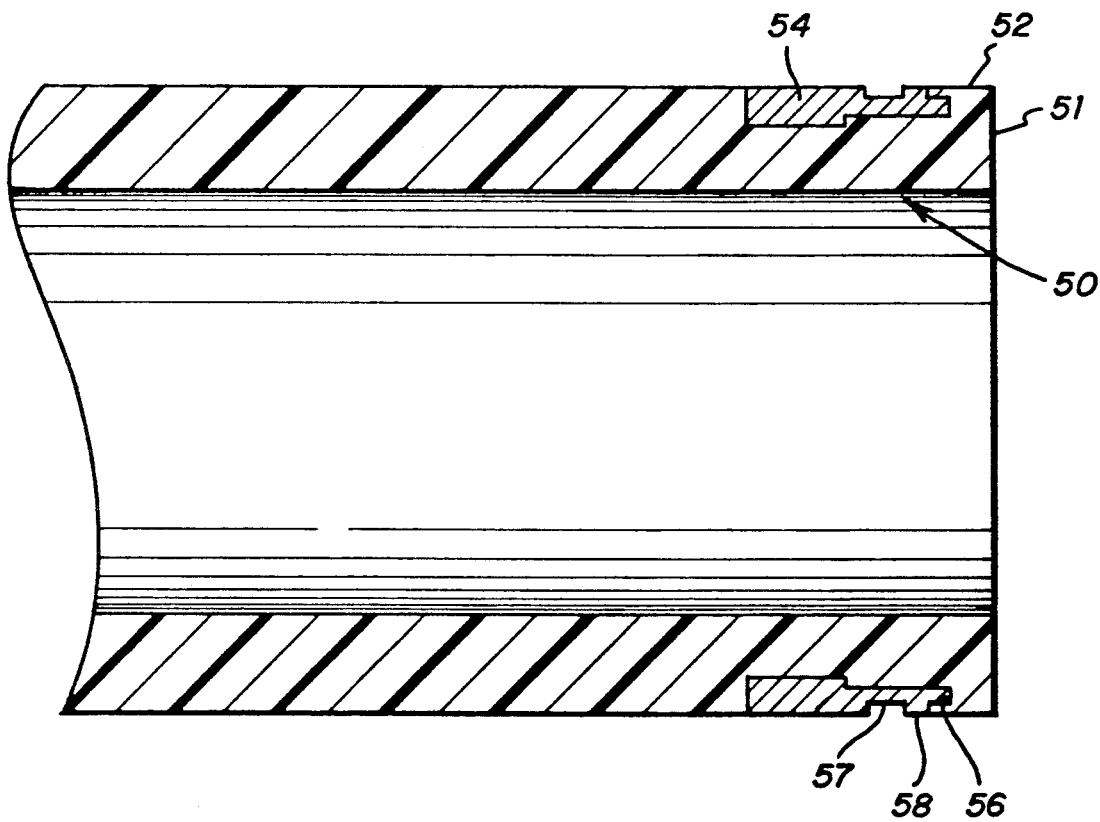
FIG. 5 is a cross sectional view of a section of pipe illustrating a metallic sleeve embedded near the end thereof.

It is possible that the metal sleeve 4 as heretofore described can be implanted in a pipe end by heat drawing and forming techniques so long as the metal sleeve is seated in and flush to the outer surface of the pipe except for the depression where the clamp mechanical key is seated. Referring to FIG. 5, a pipe end 50 has an end face 51. A sleeve 54 similar to sleeve 4 is set back from end face 51. The pipe end 50 is softened by well-known heat drawing and forming techniques is fitted over the pipe end 50 and becomes embedded therein, set back as at 52 from end face 51, said sleeve 54 has a cylindrical boss 56 and outer peripheral channel 57. The cylindrical boss 56 and outer peripheral channel 57 define a peripheral ridge 58 therebetween.

Moreover, the preferred and other embodiments of the invention have been disclosed herein, and it is to be understood that other variations and modifications may well be devised without departing from the scope of the invention which is limited solely by the appended claims.

What is claimed is:

1. Means for securing a metallic sleeve on an internally threaded plastic pipe end thereby providing a metallic surface for use in coupling said plastic pipe to another plastic pipe so equipped comprising;

a plastic hollow plug means having an internal diameter the same as the plastic pipe and external threads at one end for threadable engagement with the threads of said plastic pipe end, said plug means having a flat end face at the other end for alignment with a similar flat end face of another pipe member, said plug means having a central portion of reduced diameter which forms with said flat end face a collar, said collar having an undercut circular recess therein opposite said flat end face, said metallic sleeve about the plug means shaped at one end to fit about said central portion and seat within said undercut circular recess and at the other end in abutment with the pipe end when said plug means is threaded into said pipe end, and a depression formed in the periphery of said metallic sleeve to receive a fastener means for securing said pipe to another plastic pipe with a similar metallic sleeve.

2. A metallic coupler means for plastic pipe joints comprising;

a metallic sleeve having at one end a hollow boss and space away from said boss a circular recess defining a peripheral rib therebetween, said metallic sleeve integral with and spaced back from the end face of the plastic pipe joint, having said boss embedded beneath the surface thereby defining an outer peripheral ledge in the plastic pipe joint with the remainder of the outer periphery of said metallic sleeve exposed, and a connector means adapted to couple two plastic pipe joints together when aligned, each such plastic pipe joint having said metallic sleeve, by engaging the circular recess of each said metallic sleeve on each plastic pipe joint end.

3. The metallic coupler means of claim 2 wherein the inner periphery of the metallic sleeve has a counterbore extending from the outermost end of said circular boss.

4. The metallic coupler means of claim 2 wherein said metallic sleeve is flush with the outermost surface of the periphery of the pipe joint with said circular recess therein exposed and said boss unexposed.

5. The metallic coupler means of claim 2 wherein said metallic sleeve has a discontinuous circular recess.

6. A plastic pipe means fitted with a metallic sleeve for use in coupling two pipe ends together comprising;

said metallic sleeve, having at one end a reduced outer diameter forming a cylindrical boss and, spaced away from said cylindrical boss, an outer peripheral channel therein, said cylindrical boss and said peripheral channel defining a peripheral ridge therebetween, a plastic pipe end retaining said metallic sleeve set back from said end, said sleeve oriented with said cylindrical boss nearest the plastic pipe end and embedded therein, thereby defining an outer peripheral ledge in the plastic pipe end with said peripheral channel exposed whereby longitudinal forces applied to the metallic sleeve are transmitted into the plastic pipe end from the end face of said cylindrical boss and said peripheral ridge.

7. The plastic pipe end means of claim 6 wherein the sleeve has a counterbore extending at least through the cylindrical boss and said channel of said sleeve.

8. The plastic pipe end means of claim 6 wherein the metallic sleeve is embedded in the plastic pipe end by heat forming methods with said channel exposed.

9. The plastic pipe means of claim 6 wherein said peripheral channel is discontinuous.

10. The plastic pipe means of claim 6 wherein said plastic is polyethylene.

11. The plastic pipe means of claim 6 wherein said plastic is polypropylene.

12. Plastic pipe means of claim 6 wherein said plastic pipe end is a hollow plug externally threaded at one end for threadable engagement with a similar size internally threaded pipe joint, and suitably contoured at the other end to form a reduced diameter peripheral sector adjacent the threads and a collar having a circular undercut recess therein adjacent said peripheral sector, said hollow plug securing said metal sleeve about said peripheral sector with said cylindrical boss extending into said circular undercut recess when said hollow plug is threadably engaged with a similar size internally threaded pipe joint.

* * * * *